March 7, 1961
R. N. FLECK ET AL
2,974,179
SEPARATION OF STRAIGHT CHAIN HYDROCARBONS
WITH ZEOLITIC MOLECULAR SIEVES
AND $H_2S$ DESORBENT
Filed Feb. 3, 1958
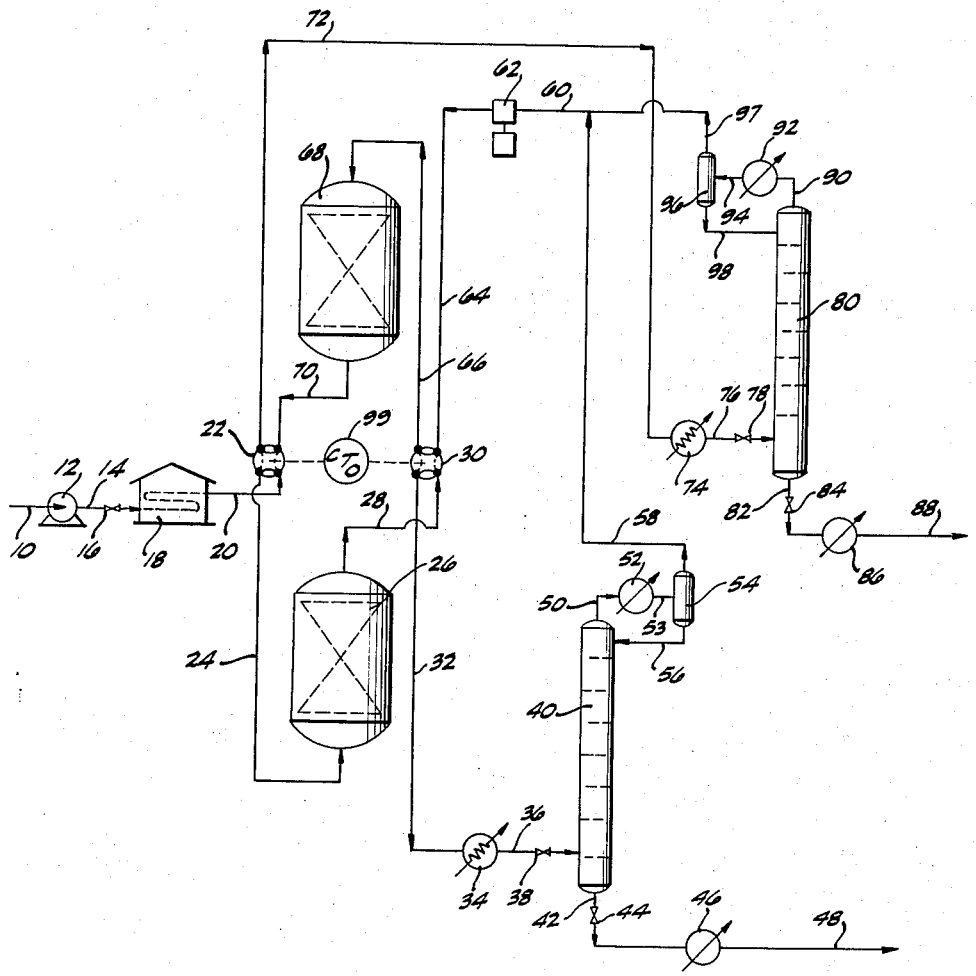
INVENTORS.
RAYMOND N. FLECK,
CARLYLE G. WIGHT.
BY Richard C. Hartman
ATTORNEY : 2,974,179
Patented Mar. 7, 1961

2,974,179

SEPARATION OF STRAIGHT CHAIN HYDRO-CARBONS WITH ZEOLITIC MOLECULAR SIEVES AND H₂S DESORBENT

Raymond N. Fleck, Whittier, and Carlyle G. Wight, Fullerton, Calif., assignors to Union Oil Company of California, Los Angeles, Calif., a corporation of California Filed Feb. 3, 1958, Ser. No. 712,869

17 Claims. (Cl. 260—676)

This invention relates to the separation of hydrocarbon mixtures, and in particular concerns the separation of straight chain hydrocarbons from mixtures comprising the same by selective adsorption on a zeolitic metallo alumino silicate adsorbent. In the various chemical and petroleum refining arts there are frequently obtained hydrocarbon mixtures of narrow boiling range, e.g., gasoline fractions and the like, from which it is desirable to separate the straight chain hydrocarbon components thereof. Various methods have been employed for such separation, including the use of selective adsorbents, e.g., activated carbon, silica gel, etc. In most instances, however, the use of selective adsorbents is not well adapted to large scale exploitation. One of the main difficulties encountered arises out of the fact that the feed stream is usually contacted with the adsorbent at a relatively low temperature, whereas treatment of the rich adsorbent to remove the adsorbed materials therefrom is effected at a relatively elevated temperature. The overall process thus requires somewhat complicated equipment and is characterized by high utility requirements.

It is accordingly an object of the present invention to provide an improved selective adsorption process for the separation of straight chain hydrocarbons from mixtures comprising the same.

Another object is to provide a process of such nature wherein the adsorption and desorption operations are carried out at substantially the same temperature.

A further object is to provide a process of such nature wherein the desorption of adsorbed materials from the rich adsorbent is effected with the aid of a normally gaseous displacement exchange fluid which is readily separated from the adsorbed and non-adsorbed components of the feed mixture.

Other and related objects will be apparent from the following detailed description of the invention, and various advantages more specifically referred to herein will be apparent to those skilled in the art upon employment of the invention to practice.

We have now found that the foregoing objects and their attendant advantages can be realized through the use of a zeolitic metallo alumino silicate as the adsorbent and the use of carbon dioxide or hydrogen sulfide as a displacement exchange fluid for treating the rich adsorbent to remove the adsorbed materials therefrom. More particularly, we have found that straight chain hydrocarbons containing from about 4 to about 12 carbon atoms can be efficiently separated from mixtures comprising the same by contacting the mixture in the vapor phase with a specific zeolitic adsorbent, hereinafter more fully described, to form a rich adsorbent, and then contacting the rich adsorbent under substantially the same conditions of temperature and pressure with carbon dioxide or hydrogen sulfide to effect displacement exchange of the adsorbed straight chain hydrocarbons. The extract and raffinate streams are then treated to separate the displacement exchange fluid therefrom, and, as will be apparent, the low boiling point of the carbon dioxide or hydrogen sulfide exchange fluid renders such treatment very simple. In commercial practice the process of the invention is carried out in a cyclic manner with recycling of the displacement exchange fluid.

The process of the invention is broadly applicable to gaseous or vaporized hydrocarbon mixtures comprising straight chain hydrocarbons containing from about 4 to 12 carbon atoms, i.e., the normal paraffins such as n-butane, n-pentane, n-octane, n-dodecane, etc., and normal olefins such as n-butene, n-hexene, n-decene, etc. Usually, of course, such hydrocarbon mixtures are of petroleum origin but they may be also derived from coal tar, sand, oil shale, or other sources. Also, such mixtures will usually be those whose components are of such a nature that they cannot be efficiently and economically separated by distillation, fractional crystallization, oil absorption, etc. Some of the hydrocarbon mixtures which are typically treated in accordance with the process of the invention are straight-run gasolines, cracked gasolines, and highly aromatic gasolines from a catalytic reforming aromatization process.

The adsorbents which are employed to separate hydrocarbons in accordance with the invention may be defined as crystalline partially dehydrated metallo alumino silicates having pores of substantially uniform diameter between about 4.5 A. and about 5.5 A. Such silicates are conveniently prepared by heating stoichiometric quantities of alumina and silica with an excess of sodium hydroxide under pressure, and thereafter washing out the excess caustic to obtain a synthetic zeolite of the approximate molecular structure $[Na_2O \cdot Al_2O_3 \cdot (SiO_2)_2]$ and having a pore diameter of about 4 A. The pore diameter of this product is then increased by exchanging part of the sodium with other metals. For example, such product is treated with a concentrated solution of a calcium salt at superatmospheric pressure and at 150°–300° C. and thereafter partially dehydrated by heating to obtain a synthetic zeolite having a pore diameter of about 5 A. and having an average molecular structure corresponding to $[CaO \cdot Al_2O_3 \cdot (SiO_2)_2]_{0.7}[Na_2O \cdot Al_2O_3 \cdot (SiO_2)_2]_{0.3}$. Further details regarding the manner of preparing the present type of adsorbents are to be found in British Patents Nos. 777,232 and 777,233. These adsorbents are also available commercially from The Linde Company, Tonawanda, New York, under the trade name "Molecular Sieves." Certain naturally occurring minerals, such as chabazite, analcite, gmelinite, and the like can be heated to dehydrate the molecule and obtain an activated zeolitic adsorbent similar in adsorption properties to the manufactured materials. The optimum particle size of the present adsorbents will depend upon the manner in which they are mechanically handled, i.e., as a fixed compact bed or by moving compact bed, or a fluidized bed, etc., but is usually between about 2 and about 100 mesh, preferably between about 4 and about 30 mesh.

The adsorbent is preferably employed in the form of a dense compact bed through which the feed and displacement exchange fluid streams are passed alternately. In the simplest embodiment of the invention, the adsorbent is employed in the form of a single static bed, in which case the process is only semi-continuous. Preferably, two or more static beds are employed with appropriate valving so that the feed stream is passed through one or more beds while the displacement exchange fluid is passed through one or more of the other beds. The flow of feed and product is continuous either up or down through the adsorbent. Any of the conventional apparatus employed in static bed fluid-solids contacting may be used.

As stated above, the displacement exchange fluid is either carbon dioxide or hydrogen sulfide. We have found that these acidic gases are unique in their ability to exchange with, and be exchanged for, straight chain hydrocarbons whose boiling points differ from those of carbon dioxide and hydrogen sulfide by as much as 350° F. Accordingly, separation of the displacement exchange fluid from the components of the feed mixture can readily be accomplished by simple distillation. Moreover, carbon dioxide and hydrogen sulfide are effective as displacement exchange fluids over a wide temperature range, including those temperatures which are most convenient for carrying out the adsorption step. An important feature of the process thus lies in the fact that it can be carried out isothermally, i.e., with adsorption and desorption being effected at substantially the same temperature.

Inasmuch as the present process is carried out in the vapor phase, the operating temperature will be at least as high as the boiling point of the highest boiling component of the feed mixture at the particular pressure employed. The latter is usually atmospheric pressure, but may be either sub-atmospheric or super-atmospheric. In general, the process is carried out at temperatures between about 0° F. and 700° F. sufficient to vaporize the components of the hydrocarbon feed mixture.

Referring now to the accompanying drawing which forms a part of this application and which is a schematic flow diagram illustrating the practice of the invention in one of its simplest embodiments, a feed stream consisting of a hydrocarbon mixture containing $C_6$ and $C_7$ straight chain hydrocarbons, e.g., a $C_6$-$C_7$ fraction from a reformate stream, enters the process via line 10 and is passed by pump 12 through line 14 at a rate controlled by valve 16 into feed heater 18. Within the feed heater the feed is vaporized at substantially atmospheric pressure. The vaporized feed stream at a temperature of about 300° F. thence passes via line 20, four-way valve 22, and line 24 into a first adsorber 26. Adsorber 26 contains a fixed bed of a solid granular metallo alumino silicate adsorbent having a pore diameter of about 5 A., e.g., Linde "Molecular Sieves 5A," and having adsorbed thereon the displacement exchange fluid (carbon dioxide) employed in a previous operational cycle. As the feed stream passes through said bed, the straight chain hydrocarbon components of the feed are adsorbed and the exchange fluid is displaced. The non-adsorbed or raffinate stream which is withdrawn from adsorber 26 through line 28 thus contains displaced carbon dioxide as well as the non-adsorbed components of the feed stream, e.g., branched chain aliphatics, naphthenes, and aromatics. The raffinate stream passes through four-way valve 30 and line 32 to heat exchanger 34, and thence via line 36 at a rate controlled by valve 38 to a first distillation column 40. The bottoms fraction from column 40 is withdrawn through line 42 at a rate controlled by valve 44 and is passed to cooler 46 and thence to storage via line 48. Said bottoms fraction constitutes the substantially straight chain hydrocarbon-free product of the process. The overhead fraction from column 40, comprising essentially the carbon dioxide exchange fluid which has been retained on the adsorbent in adsorption case 26 from the previous operational cycle, is passed via line 50 to partial condenser 52 and then to receiver 54 from which the condensate is returned to the top of column 40 via line 56. The remainder of the overhead stream is passed via line 58 to displacement exchange fluid manifold 60.

Simultaneously with the foregoing operation, the adsorbent in a second adsorber 68 is treated with the displacement exchange fluid, i.e., carbon dioxide, to desorb therefrom the straight chain hydrocarbons which were adsorbed in the previous operational cycle. The carbon dioxide is taken from manifold 60 and passed via compressor 62, line 64, four-way valve 30, and line 66 to adsorber 68 containing a fixed bed of the aforementioned adsorbent. The carbon dioxide passes downwardly through the adsorbent bed and displaces therefrom the straight chain hydrocarbons which were adsorbed during the previous operational cycle, leaving carbon dioxide adsorbed on the bed. The effluent from adsorber 68 constituting the extract stream and comprising a mixture of carbon dioxide and desorbed straight chain hydrocarbons is passed via line 70, four-way valve 22, and line 72 to a heat exchanger 74, and thence into second distillation column 80 via line 76 at a rate controlled by valve 78. The bottoms fraction from column 80 is withdrawn through line 82 at a rate controlled by valve 84, and is cooled in heat exchanger 86 and passed to storage via line 88 as the straight chain hydrocarbon product comprised essentially of $C_6$-$C_7$ normal paraffins. The overhead fraction from column 80, consisting essentially of carbon dioxide, is passed via line 90 to partial condenser 92 and thence via line 94 to receiver 96. The condensate from receiver 96 is returned to the top of column 80 via line 98. The carbon dioxide vapor phase from receiver 96 flows via line 97 to displacement exchange fluid manifold 60.

The foregoing description made with reference to the drawing comprises a single operational cycle, with adsorption of said straight chain hydrocarbons from the feed stream being carried out in first adsorber 26 and desorption of said adsorbed straight chain hydrocarbons by displacement exchange with carbon dioxide being simultaneously carried out in second adsorber 68. Upon completion of this cycle, i.e., when the adsorbent in first adsorber 26 approaches saturation with straight chain hydrocarbons, the operations are reversed by switching four-way valves 22 and 30 to their opposite position (indicated by dotted lines) by operation of cycle timer operator 99. Such operation places first adsorber 26 into the desorption part of the cycle and simultaneously places second adsorber 68 into the adsorption part of the cycle. In the next succeeding cycle, the valves are again reversed. The process illustrated by the drawing is thus a conventional adsorption operation with essentially isothermal adsorption and desorption being carried out alternately in each adsorber.

The effectiveness of the present displacement exchange fluid is demonstrated by the following experiments: A bed of Linde "Molecular Sieves 5A" was saturated with carbon dioxide, after which n-heptane and carbon dioxide were alternately passed through the bed at a temperature of 136° C. under atmospheric pressure. When steady state conditions had been attained, it was found that in each desorption cycle the carbon dioxide displaced substantially 100 percent of the heptane which had been adsorbed during the preceeding adsorption cycle. Substantially the same results were obtained when n-pentane was substituted for the n-heptane. In a third experiment, carried out at a temperature of 200° C. employing n-octane as the hydrocarbon and hydrogen sulfide as the exchange fluid, the recovery of adsorbed n-octane was likewise substantially 100 percent, as was the case in a fourth experiment where n-hexane was substituted for the n-octane. The same results were obtained when n-hexene was employed as the hydrocarbon.

While the foregoing experiments establish that the present displacement exchange fluids are capable of displacing from the rich adsorbent substantially 100 percent of the straight chain hydrocarbon adsorbed in the preceding absorption cycle, it will be realized that the exchange fluid does not displace all of the hydrocarbon which the adsorbent contains. This arises out of the fact that the effective adsorption capacity of the adsorbent, i.e., the volume of adsorbent which is available for cyclic adsorption and desorption, is somewhat less than the total adsorptive capacity. However, this does not detract from the overall efficiency of the process or the effectiveness of the present exchange fluids since it means only that the volume of adsorbent required to treat a given quantity of feed mixture in each cycle at a given temperature and pressure may be somewhat greater than theoretical.

As an exemplification of the process of the invention, a $C_7$ reformate cut comprising normal heptane in admixture with non-straight chain hydrocarbons was passed at a temperature of 136° C. and at atmospheric pressure through a bed of Linde "Molecular Sieves 5A" which had been initially saturated with carbon dioxide. The straight chain components of the hydrocarbon feed mixture were adsorbed producing a raffinate which had a substantially reduced straight chain hydrocarbon content. Upon contacting the rich adsorbent with carbon dioxide under the same conditions there was obtained an extract product essentially comprising straight chain hydrocarbons in admixture with carbon dioxide.

The present class of adsorbents has a relatively strong adsorptive affinity toward polar compounds such as ethers, thioethers, water, alcohol, mercaptans, heterocyclic nitrogen, or sulfur compounds, etc. The presence of such compounds in the feed stream more or less interferes with the adsorption process of this invention and if they are present in any appreciable quantity they should be removed prior to contacting the feed with the adsorbent. Such removal can be effected in various ways, e.g., by contacting the feed with an inorganic halide such as copper chloride, calcium chloride, magnesium chloride or the like, or with a partially dehydrated metallo alumino silicate which is capable of preferentially adsorbing such polar compound contaminants. A zeolitic metallo alumino silicate adsorbent of the present general type having a uniform pore diameter of about 8 A. to about 13 A. is satisfactory for this purpose.

In the event that the hydrocarbon feed stream should contain basically reacting materials, e.g., ammonia, amines, etc., which react chemically with the carbon dioxide or hydrogen sulfide displacement exchange fluid, the feed stream should be suitably pretreated to remove such basic materials before being contacted with the adsorbent. Such pretreatment may consist of washing the feed stream with a mineral acid or contacting it with a partially dehydrated zeolitic metallo alumino silicate adsorbent having a uniform pore diameter of about 8 A. to about 13 A.

Although the deactivation of the silicate adsorbent bed is gradual, some deactivation may eventually occur. It is within the scope of this invention to reactivate the silicate adsorbent by high temperature contacting with a hot reactivating gas such as steam, flue gas, air, etc.

In some cases the hydrocarbon feed mixture may contain either or both of the displacement exchange fluids, e.g., petroleum fractions frequently contain appreciable amounts of hydrogen sulfide. In such event a suitable amount of such displacement exchange fluid is periodically or continuously removed from the system in order to maintain a constant inventory of the exchange fluid.

As will be apparent, the process of the invention essentially comprises two substantially isothermal solids-fluid contacting operations, and any of the various techniques and equipment conventionally applied to such type of operation may be adapted to the practice of the invention without departing from the scope thereof. Thus, while it is preferred to maintain the adsorbent in the form of a fixed compact bed, the process is nevertheless operable as a moving bed operation, i.e., as a solids-fluid contacting operation in which a compact bed of the adsorbent is passed successively through adsorption and desorption zones wherein it is concurrently or countercurrently contacted with the feed stream and the displacement exchange fluid, respectively. Also, the solids-fluid contacting operations may be carried out employing fluidized techniques whereby the adsorbent is employed in relatively small particle size and is suspended by the flow of the fluid with which it is contacted. Other adaptable techniques and modifications will be apparent to those skilled in the art.

In its simplest embodiment and broadest scope the process of the invention comprises the steps of (1) contacting in vapor phase at a temperature between about 0° F. and about 700° F. a hydrocarbon mixture containing straight chain hydrocarbons of the $C_4$ to $C_{12}$ range with a solid granular adsorbent comprising a crystalline partially dehydrated zeolitic metallo alumino silicate having a pore diameter between about 4.5 A. and about 5.5 A., whereby there is obtained a raffinate product lean in said straight chain hydrocarbons and the said adsorbent enriched in said straight chain hydrocarbons; (2) contacting the enriched adsorbent with a displacement exchange fluid consisting of carbon dioxide or hydrogen sulfide, whereby there is obtained an extract product comprising said straight chain hydrocarbons and said exchange fluid, and (3) treating said extract product to separate the straight chain hydrocarbons therefrom. The rich adsorbent containing the adsorbed straight chain hydrocarbons is treated essentially isothermally to remove the adsorbed straight chain hydrocarbons, that is, at a temperature substantially the same as that maintained during the contact with the feed gas.

In the foregoing specification and in the appended claims the material to which the process of the invention is applied is described as a hydrocarbon mixture comprising certain hydrocarbon components. It is to be understood, however, that the term is meant to include mixtures of hydrocarbons containing small normally incident amounts of nitrogen, sulfur, and oxygen components.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

We claim:

1. The process for separating straight chain hydrocarbons containing from about 4 to about 12 carbon atoms from a hydrocarbon mixture comprising the same, which process comprises (1) contacting said mixture in the vapor phase with a solid granular adsorbent consisting essentially of a partially dehydrated zeolitic metallo alumino silicate having pores of a substantially uniform diameter between about 4.5 A. and about 5.5 A., said contacting being effected at a temperature between about 0° F. and about 700° F., whereby there is obtained a raffinate product lean in said straight chain hydrocarbons and a rich adsorbent comprising said silicate having said straight chain hydrocarbons adsorbed therein; (2) contacting said rich adsorbent with a displacement exchange fluid essentially comprising hydrogen sulfide whereby there is obtained an extract product comprising said straight chain hydrocarbons and said exchange fluid; and (3) treating said extract product to separate said straight chain hydrocarbons therefrom.

2. A process according to claim 1 wherein said adsorbent comprises a zeolitic calcium sodium alumino silicate having substantially uniform pore diameters of about 5 A.

3. A process according to claim 1 wherein said hydrocarbon mixture and said displacement exchange fluid are passed in contact with said adsorbent in opposite flow directions.

4. The process for separating straight chain hydrocarbons containing from about 4 to about 12 carbon atoms from a hydrocarbon mixture comprising the same, which process comprises (1) contacting said mixture in the vapor phase with a solid granular adsorbent consisting essentially of a partially dehydrated zeolitic metallo alumino silicate having pores of a substantially uniform diameter between about 4.5 A. and about 5.5 A., and being saturated with the displacement exchange fluid hereinafter defined, said contacting being effected at a temperature between about 0° F. and about 700° F., whereby there is obtained a raffinate product lean in said straight chain hydrocarbons and a rich adsorbent comprising said silicate having said straight chain hydrocarbons adsorbed therein; (2) contacting said rich adsorbent with a displacement exchange fluid essentially comprising hydrogen sulfide whereby there is obtained an extract product comprising said straight chain hydrocarbons and said exchange fluid; (3) repeating steps (1) and (2) in sequence; (4) separately treating said extract and raffinate products to separate said exchange fluid therefrom; and (5) returning the exchange fluid so separated to step (2).

5. A process according to claim 4 wherein said adsorbent comprises a zeolitic calcium sodium alumino silicate having substantially uniform diameter pores of about 5 A.

6. A process as defined by claim 4 wherein the said adsorbent is periodically contacted with a hot reactivating gas.

7. A process as defined by claim 4 wherein, in step (1), said adsorbent is moved through an adsorption zone in contact with said hydrocarbon mixture and, in step (2), said rich adsorbent is moved through an exchange zone in contact with said displacement exchange fluid.

8. A process according to claim 4 wherein said hydrocarbon mixture and said displacement exchange fluid are passed in contact with said adsorbent in opposite flow directions.

9. A process according to claim 4 wherein said hydrocarbon mixture and said displacement exchange fluid are continuously passed in alternation through at least two zones containing said adsorbent.

10. A process according to claim 4 wherein said displacement exchange fluid is present in said feed gas mixture and said displacement exchange fluid is removed from the system at a rate sufficient to maintain a substantially constant inventory of said exchange fluid in the system.

11. A process according to claim 5 wherein in step (1), said adsorbent is moved through an adsorption zone in contact with said hydrocarbon mixture and in step (2) said rich adsorbent is moved through an exchange zone in contact with said displacement exchange fluid.

12. A process according to claim 5 wherein said hydrocarbon mixture and said displacement exchange fluid are passed in contact with said adsorbent in opposite flow directions.

13. A process according to claim 5 wherein said hydrocarbon mixture and said displacement exchange fluid are continuously passed in alternation through at least two zones containing said adsorbent.

14. A process according to claim 5 in combination with the step of contacting said hydrocarbon mixture with a partially dehydrated zeolitic metallo alumino silicate adsorbent having a pore diameter of about 8 A. to about 13 A. prior to being subjected to said step (1).

15. A process according to claim 5 wherein the said hydrocarbon mixture contains basic components reactive with said displacement exchange fluid, and said hydrocarbon mixture is contacted with a mineral acid prior to being subjected to said step (1).

16. A process according to claim 1 wherein step (1) and step (2) are carried out at substantially the same temperature.

17. A process according to claim 4 wherein step (1) and step (2) are carried out at substantially the same temperature.

References Cited in the file of this patent

UNITED STATES PATENTS

| | | |
|---|---|---|
| 1,794,377 | Hasche et al. | Mar. 3, 1931 |
| 2,522,426 | Black | Sept. 12, 1950 |
| 2,603,553 | Berg | July 15, 1952 |
| 2,628,933 | Eagle et al. | Feb. 17, 1953 |
| 2,818,137 | Richmond et al. | Dec. 31, 1957 |
| 2,818,449 | Christensen et al. | Dec. 31, 1957 |
| 2,818,455 | Ballard et al. | Dec. 31, 1957 |
| 2,834,429 | Kinsella et al. | May 13, 1958 |
| 2,859,170 | Dickens et al. | Nov. 4, 1958 |
| 2,886,508 | Hess et al. | May 12, 1959 |

OTHER REFERENCES

Chemical and Engineering News, vol. 32, page 4786, Nov. 29, 1954.